(No Model.)
L. VAN HORN.
HAND GARDEN PLOW.
No. 561,455. Patented June 2, 1896.
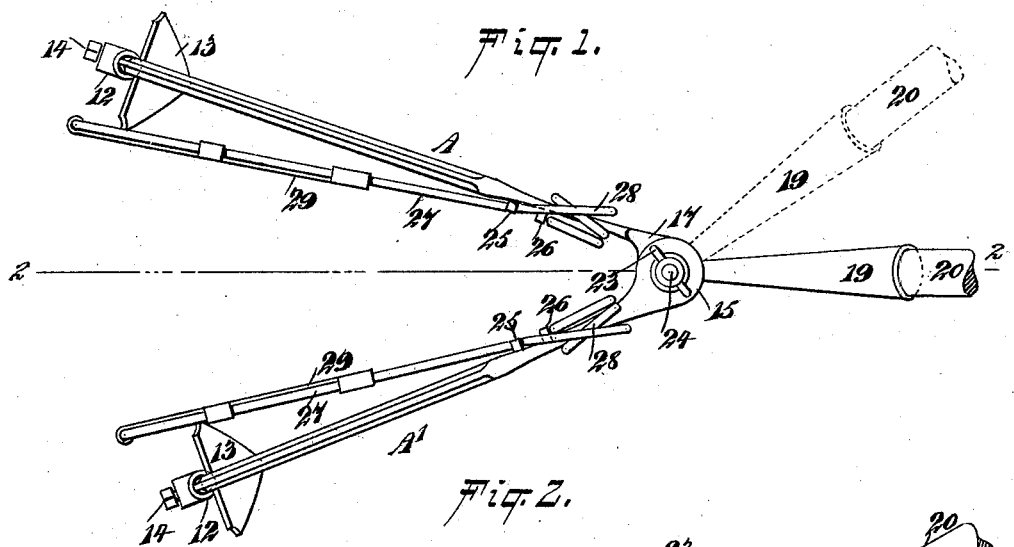
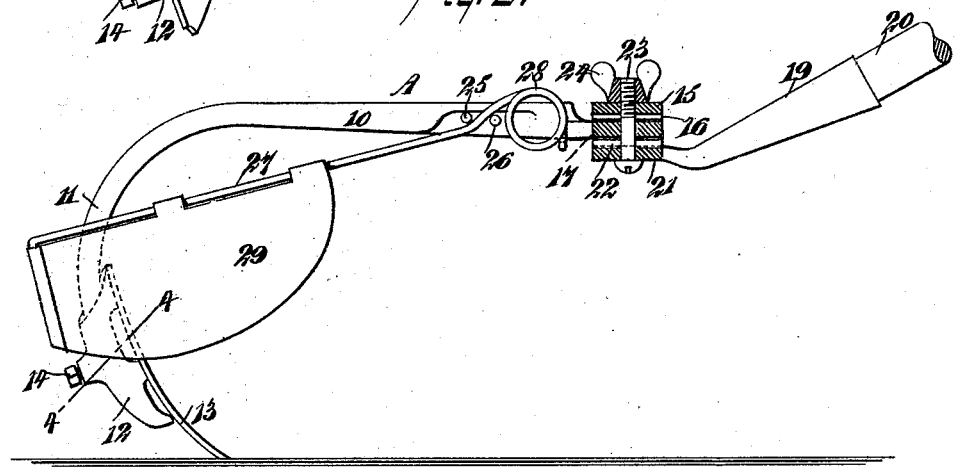
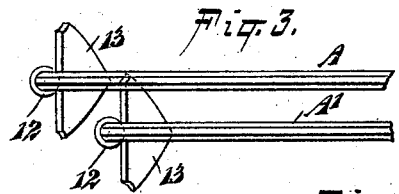
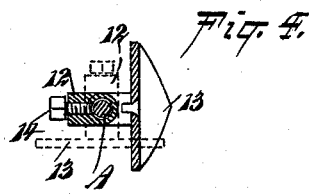
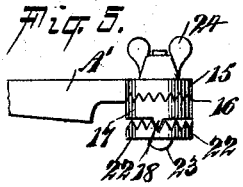
WITNESSES:
William P. Goebel
Fred Acker
INVENTOR
L. Van Horn
BY
Munn
ATTORNEYS.

UNITED STATES PATENT OFFICE.

LAUNY VAN HORN, OF LETTS, IOWA.

HAND GARDEN-PLOW.

SPECIFICATION forming part of Letters Patent No. 561,455, dated June 2, 1896.

Application filed February 14, 1896. Serial No. 579,235. (No model.)

*To all whom it may concern:*

Be it known that I, LAUNY VAN HORN, of Letts, in the county of Louisa and State of Iowa, have invented a new and Improved Hand Garden-Plow, of which the following is a full, clear, and exact description.

The object of the invention is to construct a hand garden-plow in such manner that it may be utilized as a marker, a coverer, and a cultivator, and, furthermore, to provide for the lateral adjustment of the handle of the plow relative to the shanks thereof, the adjustment being accomplished in an exceedingly simple and expeditious manner and so that the plow will be thoroughly under the control of the operator.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the improved implement. Fig. 2 is a longitudinal vertical section taken substantially on the line 2 2 of Fig. 1. Fig. 3 is a plan view of the shanks and shovels of the implement, illustrating the shanks brought in parallel position and the shovels as located one in advance of the other. Fig. 4 is a horizontal section taken substantially on the line 4 4 of Fig. 2, and Fig. 5 is a detail side elevation of the mechanism whereby the shanks of the implement are adjusted and whereby the handle is adjusted relative to the shanks.

In carrying out the invention two beams A and A' are preferably employed, the upper portions 10 of the said beams being substantially straight, as shown in Fig. 2, and their rear ends 11 are given a downward and forward curvature. The rear end portions of the aforesaid beams are preferably made circular in cross-section; but the remaining portions of the beams may be given any desired cross-sectional contour.

A sleeve 12 is loosely mounted upon the lower extremity of each beam A and A', and a shovel 13 of any desired shape is secured to the inner face of each sleeve in any suitable or approved manner. The sleeves are adjustably secured upon the shanks through the medium of set-screws 14 or their equivalents, which are passed through the rear central portion of the sleeves to an engagement with the beams, as is shown best in Fig. 4. Under such a construction and arrangement the shovels may be given an inclination in direction of either side of the beams to which they are attached, or the said shovels may be made to face entirely inward or entirely outward, as shown in dotted lines in Fig. 4.

The beams are of different lengths, the beam A, for example, being longer than the beam A', and the said beams are pivotally and adjustably connected at their forward ends, so that said beams may be brought close together and in parallel position, as shown in Fig. 3, and one of the shovels may be brought practically in front of the other. The shorter beam A' is represented as the uppermost beam in the drawings, and its forward end terminates in a disk 15, the disk being provided with ratchet-teeth 16 upon its under face. The longer beam A terminates at its forward end in a disk 17, and the said disk has ratchet-teeth formed upon its upper face adapted for engagement with the teeth on the disk of the uppermost or shorter beam A'. Preferably a single tooth 18 is formed upon the under face of the undermost disk 17.

A ferrule 19 is provided for the reception of a handle 20 of any approved construction, and a disk 21 is secured to or made integral with the lower end of the said ferrule, being at an angle to the body of said ferrule, yet horizontally located, and upon the upper face of the disk 21 a series of ratchet-teeth 22 is produced, adapted to receive between them the single tooth 18 on the lowermost disk 17 of the plow-beams; but if in practice it is found desirable a series of ratchet-teeth may be formed upon the undermost face of the lowermost disk 17 of the beams instead of the single tooth illustrated. The disk of the ferrule and the disks of the plow-beams are pivotally connected through the medium of a bolt 23, which at its upper end preferably is provided with a thumb-nut 24 or the equivalent of the same.

Upon the inner face of each plow-beam A and A', at a point near their forward ends, two studs or posts 25 and 26 are formed or secured, and a spring-arm 27 is passed between each two posts 25 and 26, each spring-arm terminating at its inner end in a coil 28, one coil being secured to the beam A and the other coil to the beam A'. When the spring-arms have been passed between their guide-studs 25 and 26, they will have a downward and rearward inclination facing one another, being at the inner faces of the beams, and the length of the spring-arms is governed by the length of the beam with which it is connected.

A fender 29 is secured in any approved manner to the rear portion of each spring-arm, and these fenders may be given any desired shape, although preferably their bottom edges are more or less convexed, as shown in Fig. 2. When the spring-arms are in their downward position, the fenders will extend some distance vertically downward along the inner edge of the shovel near which the fender may be located, as shown also in Fig. 2. When the fenders are thus placed, they will protect the tops of the plants the roots of which are under cultivation, and when the fenders are not needed the spring-arms to which they are attached are withdrawn from between the guide-studs 25 and 26, and the coils 28 will immediately carry the spring-arms and attached fenders to an upper position, or to a position practically above the beams, so that the fenders will be entirely out of the way.

When the implement is used as a marker, the operator will adjust one shovel directly behind the other, as illustrated in Fig. 3, and as a cultivator the operator can adjust the shovels to any desired space by simply loosening the thumb-nut 24. When the implement is employed as a marker for peas, beans, onions, &c., the shovels may be turned on the shanks or curved portions of the beams in a manner to throw the dirt outward, thus making a deep wide furrow, if desired. After the seed has been dropped in the furrow the operator may use the implement to cover the seed simply by carrying the beams sufficiently far apart to place the shovels on either side of the row, in which position they will throw the soil inward, leaving a ridge of soft mellow earth immediately over the seed and a small drain or furrow on each side of the row, which is essential in the event of a heavy beating rain.

After the plant is up and the operator wishes to cultivate one side of a row at a time, the operator can adjust the shovels so that they will almost come together, (thus cutting out the middles,) and as fast as the operator can walk up one side of the row and down the other the ground is plowed and thoroughly worked.

Since the inside shovel of the plow stands a little ahead of the outside shovel the rear shovel covers the furrow that the front one has made, leaving a ridge next to the plant. The beams are of such height and the shovels so adjusted that all trash passes away from the row, said trash being left in the center. Therefore the shovels will not become clogged or choked. To cultivate both sides of a row when the plants are small, the fenders are adjusted to their lower position and the beams are moved a desired distance apart. As the operator is always ahead of his work, when the garden is plowed over the ground will be left loose and mellow and not a foot-print will be visible. The plow is light and may be adjusted with great rapidity without the need of a wrench, and when adjusted to proper position the parts of the implement will remain firmly fastened until a change is desired by the operator.

The handle of the implement, as heretofore stated, may be placed at any desired angle to the beams, even at a right angle, so that the operator can plow a row and have the plow practically at his side. Great advantages are obtained by reason of the adjustment of the handle, especially when plowing around currant-bushes, berry-bushes, and like plants.

Having thus described my invention, I claim as new and desire to secure by Letters Patent—

1. In a hand garden-plow, two beams of different lengths, pivotally connected and provided with a locking device at their pivotal point, and interlocking teeth, and spring-controlled fenders carried by the beams, capable of assuming a position at the inner sides of the shovels or above the said shovels, as and for the purpose specified.

2. In a hand garden-plow, two beams of different lengths, pivotally connected and provided with a locking device at their pivotal point, and interlocking teeth, shovels adjustably secured to the said beams, posts projected from the inner face of each beam, a spring-arm passed between the posts of each beam, terminating at a coil at its forward end attached to the beam, and a fender secured to the rear end of each of the said spring-arms, as and for the purpose specified.

3. In a hand garden-plow, the combination, with two beams of different lengths, adjustably connected at their forward ends and provided with locking devices at said ends, of shovels adjustably secured to the lower rear portions of the shanks, keepers attached to the shanks near their forward ends, spring-arms having their forward ends coiled around the said shanks and removably engaged by the aforesaid keepers, and fenders attached to the rear portions of the said arms, extending in a downwardly direction, as and for the purpose specified.

4. In a garden-plow, beams pivotally and adjustably connected at their forward ends and of different lengths arranged to be adjusted in alinement, said ends terminating in disks one above the other, the upper disk having ratchet-teeth formed on its under face and the lower disk having ratchet-teeth on its upper and under face, a ferrule for the handle being also provided with a disk, said latter disk having ratchet-teeth upon its upper face adapted to receive between them the ratchet-teeth on the under face of said former lower disk, and a pivot-pin inserted through all of said disks, whereby the said disks may be connected adjustably by the interlocking of said teeth, as and for the purpose set forth.

LAUNY VAN HORN.

Witnesses:
J. B. CONTANT,
J. Q. CODER.